(12) United States Patent
Baer et al.

(10) Patent No.: US 11,660,751 B2
(45) Date of Patent: May 30, 2023

(54) METHOD, ROBOT SYSTEM AND COMPUTER READABLE MEDIUM FOR DETERMINING A SAFETY ZONE AND FOR PATH PLANNING FOR ROBOTS

(71) Applicant: Siemens Aktiengesellschaft, Munich (DE)

(72) Inventors: Felix Baer, Fuerth (DE); Rene Graf, Zirndorf (DE); Ralf Gross, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 295 days.

(21) Appl. No.: 17/091,184

(22) Filed: Nov. 6, 2020

(65) Prior Publication Data

US 2021/0138649 A1 May 13, 2021

(30) Foreign Application Priority Data

Nov. 7, 2019 (EP) ..................................... 19207577

(51) Int. Cl.
*B25J 9/16* (2006.01)
(52) U.S. Cl.
CPC ........... *B25J 9/1666* (2013.01); *B25J 9/1676* (2013.01); *B25J 9/1682* (2013.01); *G05B 2219/39099* (2013.01)
(58) Field of Classification Search
CPC ...... B25J 9/1664; B25J 9/1666; B25J 9/1669; B25J 9/1676; B25J 9/1682; G05B 2219/35182; G05B 2219/39099; G05B 2219/49148; G05B 2219/49145
See application file for complete search history.

(56) References Cited

U.S. PATENT DOCUMENTS

| | | | |
|---|---|---|---|
| 6,678,582 B2 | 1/2004 | Waled | |
| 9,895,803 B1* | 2/2018 | Oslund | ................. B25J 9/1666 |
| 10,155,312 B2 | 12/2018 | Feldmann et al. | |
| 2003/0225479 A1* | 12/2003 | Waled | ................... B25J 9/1676 |
| | | | 700/245 |

(Continued)

FOREIGN PATENT DOCUMENTS

| | | |
|---|---|---|
| DE | 102008013400 A1 | 9/2009 |
| EP | 1366867 A2 | 12/2003 |

(Continued)

*Primary Examiner* — Spencer D Patton
(74) *Attorney, Agent, or Firm* — Laurence A. Greenberg; Werner H. Stemer; Ralph E. Locher

(57) ABSTRACT

An automated method determines a safety zone for a robot. The robot carries out operations along a specified trajectory. For collision-free operation, a safety zone is determined by: dividing the specified trajectory into a plurality of subtrajectories; determining a plurality of fine-grained envelope cuboids around extreme points of each subtrajectory; and determining a number of optimized envelope cuboids from an enlargement of individual fine-grained envelope cuboids in relation to the volume occupied by the enlarged fine-grained envelope cuboids. The optimized envelope cuboids determined in this way form the safety zone for the trajectory. This automated method can be expanded to multiple trajectories of a robot, multiple robots, and replanning a trajectory for an occupied semaphore zone.

13 Claims, 7 Drawing Sheets

(56) References Cited

U.S. PATENT DOCUMENTS

2009/0222107 A1* 9/2009 Moddemann ......... H04L 12/403
                                                      700/21
2020/0189098 A1* 6/2020 Kalakrishnan ......... B25J 9/1653

FOREIGN PATENT DOCUMENTS

| WO | 2015176802 A1 | 11/2015 |
| WO | 2018051151 A1 | 3/2018 |

* cited by examiner

Table 2

METHOD, ROBOT SYSTEM AND COMPUTER READABLE MEDIUM FOR DETERMINING A SAFETY ZONE AND FOR PATH PLANNING FOR ROBOTS

CROSS-REFERENCE TO RELATED APPLICATION

This application claims the priority, under 35 U.S.C. § 119, of European application EP 19 207 577, filed Nov. 7, 2019; the prior application is herewith incorporated by reference in its entirety.

BACKGROUND OF THE INVENTION

Field of the Invention

The invention relates to a method for determining a safety zone for a robot, a robot system for carrying out the method for determining the safety zone, and a computer program, which carries out the steps of the method for determining a safety zone for a robot.

Robots are universally deployable moving automatic machines, the movements of which are freely programmable with regard to the sequence of movements and routes or angles and are sensor-guided as appropriate. This kind of robot can be equipped with grabbing devices, tools and other manufacturing means, and is able to carry out handling and/or manufacturing tasks.

Today, the operation of robots is possible either only behind guards or protective devices. In the case of protective devices, the signals of the devices have to be evaluated as fail-safe, e.g. by a fail-safe programmable logic controller. Guards are e.g. mechanical shields, which prevent the robot from leaving the zone assigned to it. In addition, these barriers, which for the most part are realized as fences or lattices, prevent people from entering the operating zone of the robot in an uncontrolled manner.

In the meantime, there have been first attempts for the robot to have a secure monitoring of its position, so that the position of the robot is available in Cartesian coordinates in a fail-safe controller, and the response to particular safety devices (laser scanner, light barrier, door switch, . . . ) can take place as a function of the current position. Fail-safe controllers differ from "normal" controllers by way of the monitoring of inputs/outputs and the redundant execution of the control program. For example, in a fail-safe controller, two "normal" controllers may be installed, on which the same program is run in parallel, and the partial results/results of the two controllers are compared against one another. If they do not match, then a controlled shutdown takes place, so that no hazardous situations are caused as a result.

The problem here, however, is safely defining the positions and ranges of all safety devices. Currently, this definition takes place manually in a planning phase, which is prone to errors and complicates the acceptance process. In addition, it must be ensured that the safety zones give the robot sufficient operating space for it to be able to carry out all intended movements.

In a robot cell, on the one hand, defined paths/trajectories are specified to the robot, which it is to travel through as part of its tasks to be completed, and on the other hand, the cell has defined safety zones, in which the robot is permitted to move at all. These safety zones may be flagged as not available at present on the basis of additional safety devices, meaning that the robot is not permitted to traverse these zones or intrude into these zones.

If a robot is not able to travel in/occupy an occupied safety zone, then it remains stationary and must wait for the release of the safety (sub)zone in question. As a function of the geometry of the cell and further safety devices, however, it is permitted to continue the movement automatically, without a (manual) acknowledgement having to be issued beforehand. This blockage, however, reduces the productivity of the robot cell.

A requirement for the correct consideration of the safety zones is a "Cartesian safety" of the robot, meaning that its fail-safe controller knows the precise position and can therefore respond. The term "Cartesian safety" contains: the fail-safe controller of a machine in general and of a robot in particular knows the positions of the joints and of the tool center points (TCPs) in Cartesian space, which positions have been calculated via the direct kinematics of the machine/robot. A basic requirement is the fail-safe detection of the joint angles via corresponding sensors, as well as the tamper-proof data transport from the sensors to the controller via one or also multiple fail-safe bus systems. The calculation of the direct kinematics must take place in the fail-safe controller, entirely by means of fail-safe program modules for the necessary calculation steps (addition and multiplication).

The planning of the safety zones takes place manually, which is also partially due to the fact that the planning of the movements of the robot takes place independently or at a later point in time. Therefore, no correlation can take place between the robot movement on a specified trajectory and the safety zone(s), meaning that the latter are preferably defined in the size of the maximum operating space of the robot, in order to avoid restricting the later movement.

In this context, spheres are laid around the relevant joints and points of the robot, e.g. tool center points TCP, with a corresponding radius and cuboids or planes are subsequently defined tangentially to the spheres. The robot is not permitted to leave or enter or traverse these cuboids/planes, on an optional basis. In FIG. 1, this situation is shown for a robot cell 15 containing a robot 5, wherein the safety zone S has been defined in the form of a cuboid.

International patent publication WO 2018/051151 A1 [1] discloses a "method and a computer system for simulating and certifying safety management for an area of a production plant", in which at least one robot and at least one person are situated, with the method steps:
a) defining a table, which contains human extremities and corresponding potentials for hazardous situations/damage;
b) simulating the operating processes of the robot, whereby a first movement space volume is determined;
c) simulating the action of the person, whereby a second movement space volume is determined;
d) determining penetrations into the two volumes, taking into consideration the potentials for hazardous situations/damage of the two volumes;
e) in the case of a penetration, new layout of the operating processes and actions of the person, until there is no longer any penetration or the potentials for hazardous situations/damage are not reached.

International patent disclosure WO 2015/176802 A1 [2], corresponding to U.S. Pat. No. 10,155,312, discloses a "method for preventing collisions of a robot with a cooperating worker", in which the critical path points (posing a risk of collision) and path trajectories are ascertained by means of a simulation (e.g. bottlenecks, pinch points or contact points), and collisions are simulated at these points by means of a pendulum simulating a worker (or a second robot), from which the variables influencing the movement of the first robot, e.g. the permissible movement speeds of the robot, are ascertained.

In both cases, the disadvantage of these methods is the fact that these methods cannot be certified in the planning phase and blockage situations are only resolved in real time, i.e. during operation.

BRIEF SUMMARY OF THE INVENTION

The object underlying the present invention is thus to specify a method for determining safety zones for a robot, which, in an automated manner, does not cause unnecessary blockages of the robot for a specified trajectory, and in which the safety zone makes optimum use of the operating zone of a robot. A robot system and a computer program for carrying out the method for determining safety zones for a robot are also specified.

This object is achieved by the measures specified in the independent claims. Advantageous embodiments of the invention are specified in further claims.

The method according to the invention is characterized by a:

Method for determining a safety zone for a first robot, which carries out operations along a specified trajectory, wherein a safety zone for a collision-free operation is determined by the following method steps:
a) Dividing the specified trajectory into a plurality of subtrajectories;
b) Determining a plurality of envelope cuboids—referred to as fine-grained envelope cuboids in the following—around extreme points of each subtrajectory; and
c) Determining a number of optimized envelope cuboids from an enlargement of individual fine-grained envelope cuboids in relation to the volume occupied by the enlarged fine-grained envelope cuboids, wherein the optimized envelope cuboids determined in this way form the safety zone for the trajectory.

The advantages of this solution are as follows:
i) The conventional approach when generating the safety zones of a robot is highly time-consuming and requires the specialized domain knowledge of both a safety expert and a robotics expert. In this context, the optimum solution is often not found due to the complexity. As part of digitalization, the interaction between a plurality of robots (and also people) within a processing cell is becoming increasingly important. By way of the method according to the invention, the preparation for this and a performance which is optimized in terms of computing power take place on an automated basis in the simulation phase.
ii) The certification (e.g. by a quality control association) of such safety scenarios can be illustrated more effectively by the simulation-supported method, in that the interaction with safety devices can already be shown in the simulation.
iii) The approach when developing the safety concept becomes more efficient, as the simulation identifies possible danger zones and is optionally able to make proposals for excluding these.

Particular embodiments of the present invention have the now described following advantages.

By overlaying the trajectories necessary for managing tasks, the safety zone of the robots involved corresponding thereto can already be determined entirely in the simulation phase.

The reduction of the number of safety zones increases the later processing speed in the fail-safe controller and thus the productivity of the manufacturing cell.

Possible implementations, e.g. adjustments to the benches of the laser scanners, zone muting of light grids, are already determined in the simulation program automatically.

Overlaying safety zones of two robots according to the semaphore principle brings about the necessary collision protection of machines, at the same time with the greatest possible openness of the plant and greatest possible flexibility.

In the past, constructing mechanical cages around robots was a proven solution. With this particular embodiment, constructing mechanical cages is no longer required. This is also important, because the supply of materials today at least partially also takes place by means of robots.

It is the state of the art to recalculate a robot trajectory during normal operation. In a further embodiment of the invention, however, the recalculation of a trajectory can take place in the planning phase in a fail-safe controller, taking into consideration certified safety zones. The great advantage is that the productivity of the robot is increased, while simultaneously observing the permitted safety zones. The recalculated trajectory is stored, but is only used when required—when a blockage occurs in real time. The fail-safe controller therefore possesses a trajectory library of recalculated or alternative trajectories.

Other features which are considered as characteristic for the invention are set forth in the appended claims.

Although the invention is illustrated and described herein as embodied in a method for determining a safety zone and for path planning for robots, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In this context of this document, the following terminology and a corresponding hierarchy of terms are used:
i) A zone is formed from at least one envelope cuboid.
ii) Envelope cuboids have a varying granularity as a result of the method steps, meaning that a distinction is made, in descending order of granularity, between:
b) fine-grained envelope cuboids 21;
c) optimized envelope cuboids 22;
d) global envelope cuboids 20.

Depending on the perspective, a distinction is further made between the preceding terms as follows:
Safety zone S and operating zone A.
Contrary to the usual meaning of a safety zone S and an operating zone A, e.g. in a fire fighting service context, in which the safety zone (=area cordoned off for the public) is considerably larger than the operating zone of the fire fighters, the following applies in the context of this technology
a) $S \subseteq A$.

The operating zone A of a robot 5 indicates the space which a robot 5 is potentially able to reach. The safety zone S of a robot 5 is the subspace of the operating zone A, namely:
$S \subseteq A$, in which the robot 5 is permitted to move without a risk of colliding with other objects.

Figure 5:
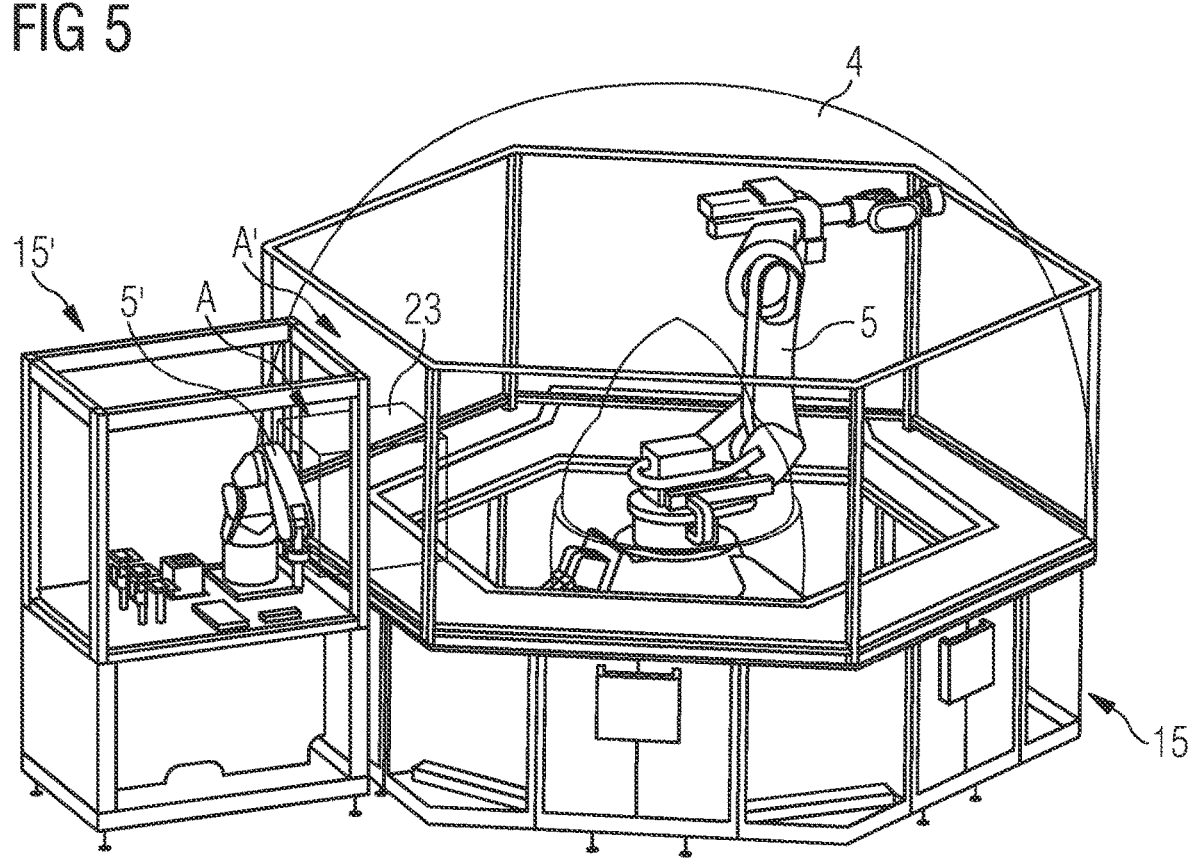
FIG. 5 is a perspective view of two robot cells with a semaphore zone.

These relationships can be seen in FIG. 5. FIG. 5 shows a potential collision zone 23 of each trajectory of a robot 5 and of a robot 5'. This collision zone 23 has resulted from an overlaying of two safety zones S and S', not shown in FIG. 5. In FIG. 5, however, the (larger) operating zones A and A' are shown, wherein the reference characters with the arrows A and A' are not interchanged. It should therefore also be shown once more that the following relation applies (see above):
a) $A \supseteq S$ and $A' \supseteq S'$.

Figure 1:
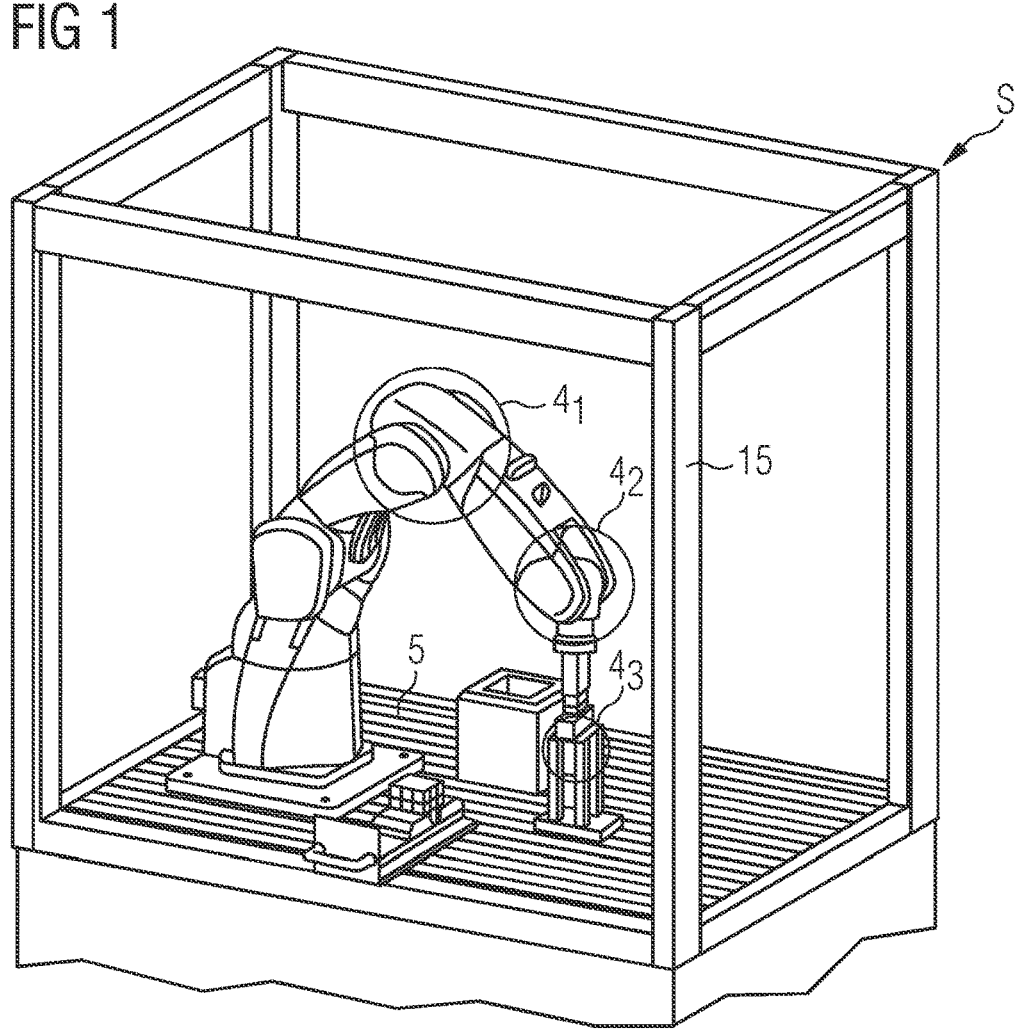
FIG. 1 is a diagrammatic, perspective view of a robot in a robot cell.

FIG. 1 shows a robot cell 15, which contains a robot 5. The safety zone S of the robot cell 15 is formed by a cuboid; the operating zone A is larger, as can be plainly seen in FIG. 1. If the safety zone S were delimited by panes, then the robot 5 could penetrate the panes due to unauthorized movements, and destroy them as a result.

An envelope cuboid 20 can be formed around a plurality of delimiting spheres 4 and/or envelope ellipsoids 4. Three such delimiting spheres $4_1$, $4_2$ and $4_3$ are shown in FIG. 1. The delimiting spheres $4_1$, $4_2$ and $4_3$ are laid around the relevant joints and points of the robot, e.g. tool center points TCP, with a corresponding radius and cuboids or planes are subsequently defined tangentially to the spheres. An envelope cuboid 20 is laid around a plurality of such delimiting spheres 4. In the specific case of FIG. 1, the frame does not represent the envelope cuboid 20, but rather the safety zone S defined by the envelope cuboid 20. The envelope cuboid 20 is not referenced in FIG. 1.

Figure 2:
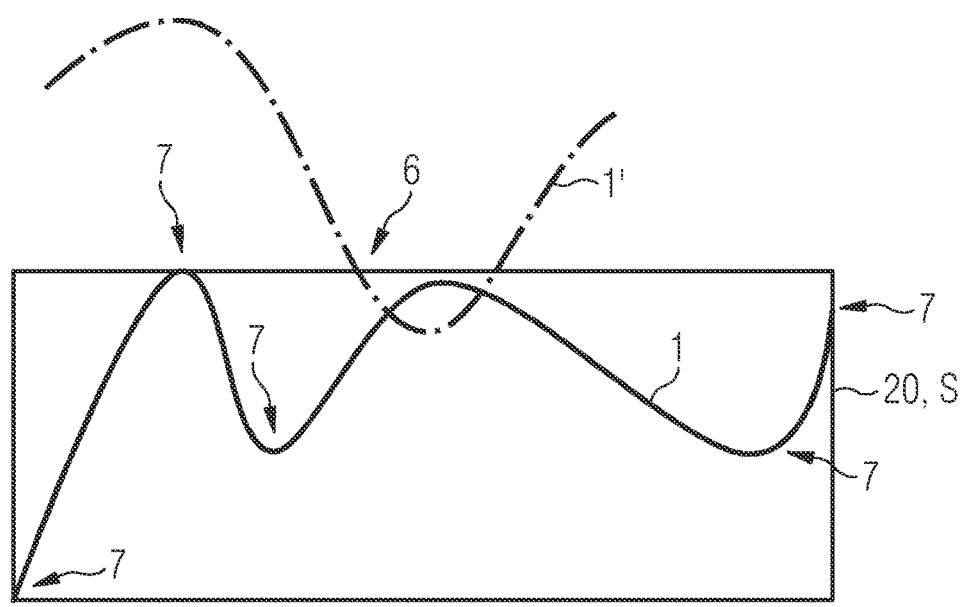
FIG. 2 is a graph showing a representation of a collision/blockage situation to be prevented.
Figure 3A:
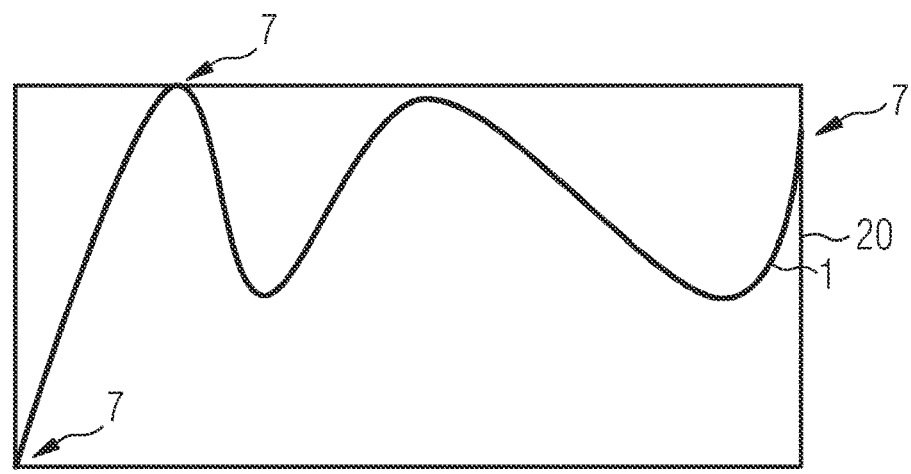
FIG. 3A is a graph showing a diagram of a global envelope cuboid.

Let us say that a robot 5 moves along a trajectory 1—as shown in FIG. 3A. In a simplified representation according to FIG. 3A: the envelope cuboid 20 is determined by the extreme points 7 of the trajectory 1. In FIG. 3A, only the extreme points which somewhat contribute to the dimensioning of the envelope cuboid 20 are provided with a reference character 7. At this point, it is mentioned that FIG. 2, FIG. 3A, . . . contain a two-dimensional view of a three-dimensional space. As explained above, for the determination of the envelope cuboids it is not just the extreme point 7 which is used, but rather the disposition of a robot 5 applicable to an extreme point 7, with the respective delimiting spheres 4 added thereto. In a simplified embodiment, it is also possible to adopt a fixed disposition of the robot 5 for each extreme point 7 and accordingly to assume fixed, specified delimiting spheres 4.

FIG. 2 shows a potential collision or blockage situation. An actual collision or blockage situation depends upon the temporal sequence of the process of robots 5, 5', . . . involved. Regarding the trajectory 1 of a first robot 5, as mentioned above, an envelope cuboid 20 is defined via extreme points 7 of this trajectory 1, which in this case coincides with the safety zone S associated with the trajectory 1. A trajectory 1' is provided for a second robot 5'. If the robot 5' now moves, according to FIG. 2, from left to right on the trajectory 1', then in the case of the arrow 6 a penetration into the safety zone S of the robot 5 is caused. A controller will stop the robot 5'. With this largely dimensioned safety zone S, a blockage is also produced when the robot 5 is outside the range of the robot 5'.

To determine an optimum safety zone S, method steps are provided which are explained in the following together with FIG. 3B and FIG. 3C. Here, the trajectory 1 of a robot 5 is represented in a two-dimensional manner, but in reality the trajectory is three-dimensional. In the further course of the explanation, reference is made to spheres and cuboids surrounding the spheres, but a variant with spheres and/or ellipsoids and/or areas/planes functions according to exactly the same principle.

Figure 3B:
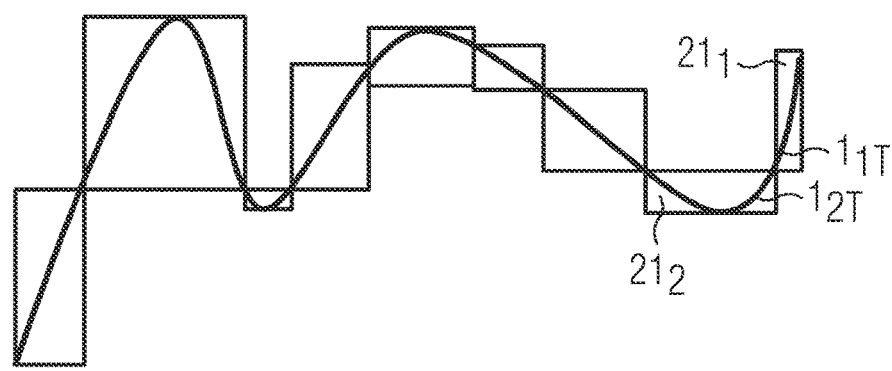
FIGS. 3B and 3C are graphs showing a visualization of the method steps for generating optimum safety zones for a robot trajectory.
Figure 3C:
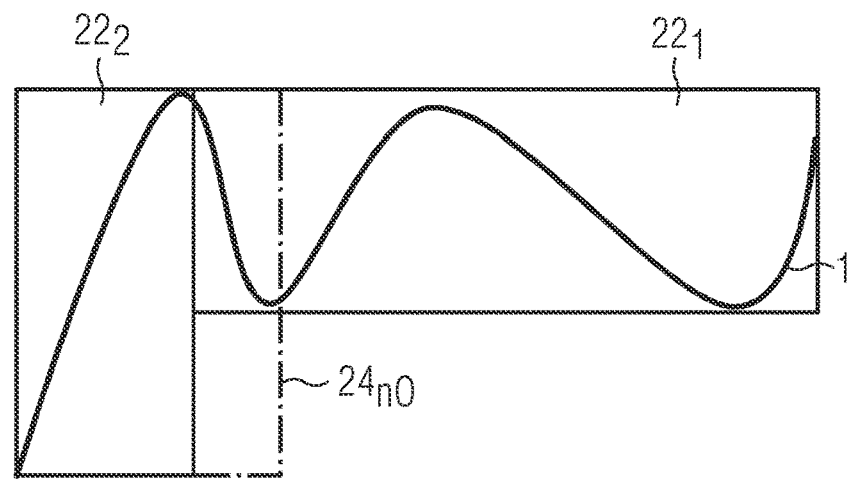

In FIG. 3B, the trajectory 1 is divided into subtrajectories $1_{1T}$, $1_{2T}$, . . . . Laid around each subtrajectory $1_{1T}$, $1_{2T}$, . . . , over the extreme points 7 of the subtrajectory in question, is an envelope cuboid $21_1$, $21_2$, . . . . In order to simplify the representation, not all envelope cuboids are indicated.

In operation, this plurality/large number of such fine-grained envelope cuboids $21_1$, $21_2$, . . . are not suitable, as this causes the computing time for a "Cartesian safety" to rise exorbitantly, as too many envelope cuboids 21 would have to be checked against the spheres on a robot 5. Therefore, the combination of number of envelope cuboids and occupied volume is optimized via an optimization method by enlarging individual fine-grained envelope cuboids $21_1$, $21_2$, . . . . It is also possible to specify the number of optimized envelope cuboids in a fixed manner and, from this fixed, specified number, to minimize the volume occupied thereby. According to FIG. 3C, two optimized envelope cuboids $22_1$ and $22_2$ are shown. As a result, the least space/volume not travelled through by the robot 5 in any case needs to be monitored, simultaneously with the minimum necessary computing power. In order to explain the optimization of individual fine-grained envelope cuboids 21 compared to the volume occupied thereby, an unoptimized envelope cuboid $24_{nO}$ is recorded in FIG. 3C with dashed-and-dotted lines; accordingly, the envelope cuboid $22_1$ shown on the right would have to be shown in an abbreviated manner, which is not shown for reasons of clarity in FIG. 3C.

In addition to the specified trajectory 1 of the robot 5, simulation programs such as Process Simulate for example also make it possible to take into consideration static obstacles in the manufacturing cell 15, as these are accordingly present as available geometries in the 3D CAD model, which is not possible in the case of a global envelope cuboid 20.

Figure 4:
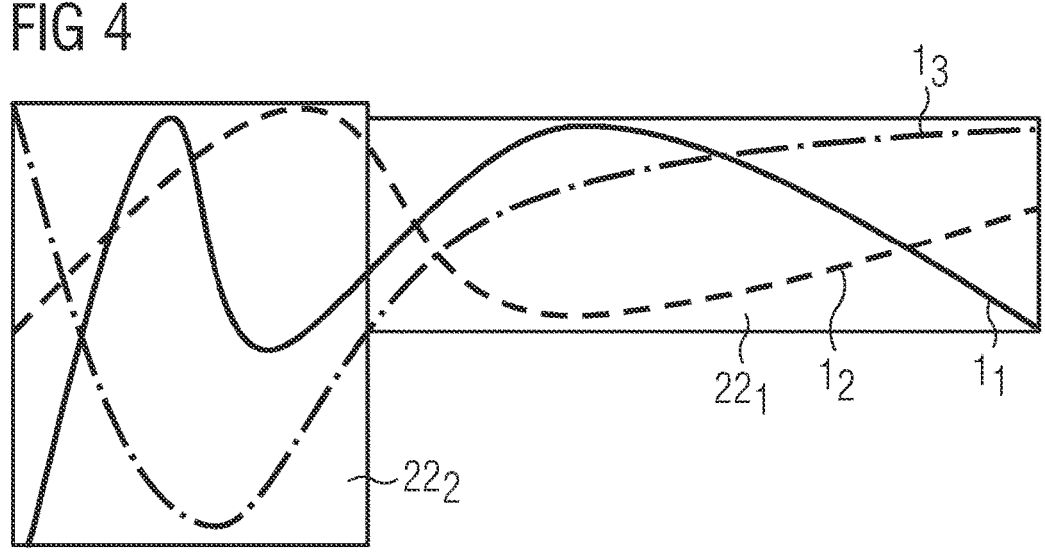
FIG. 4 is a graph showing a result of the method steps for generating the optimum safety zone for a plurality of robot trajectories.
Figure 9:
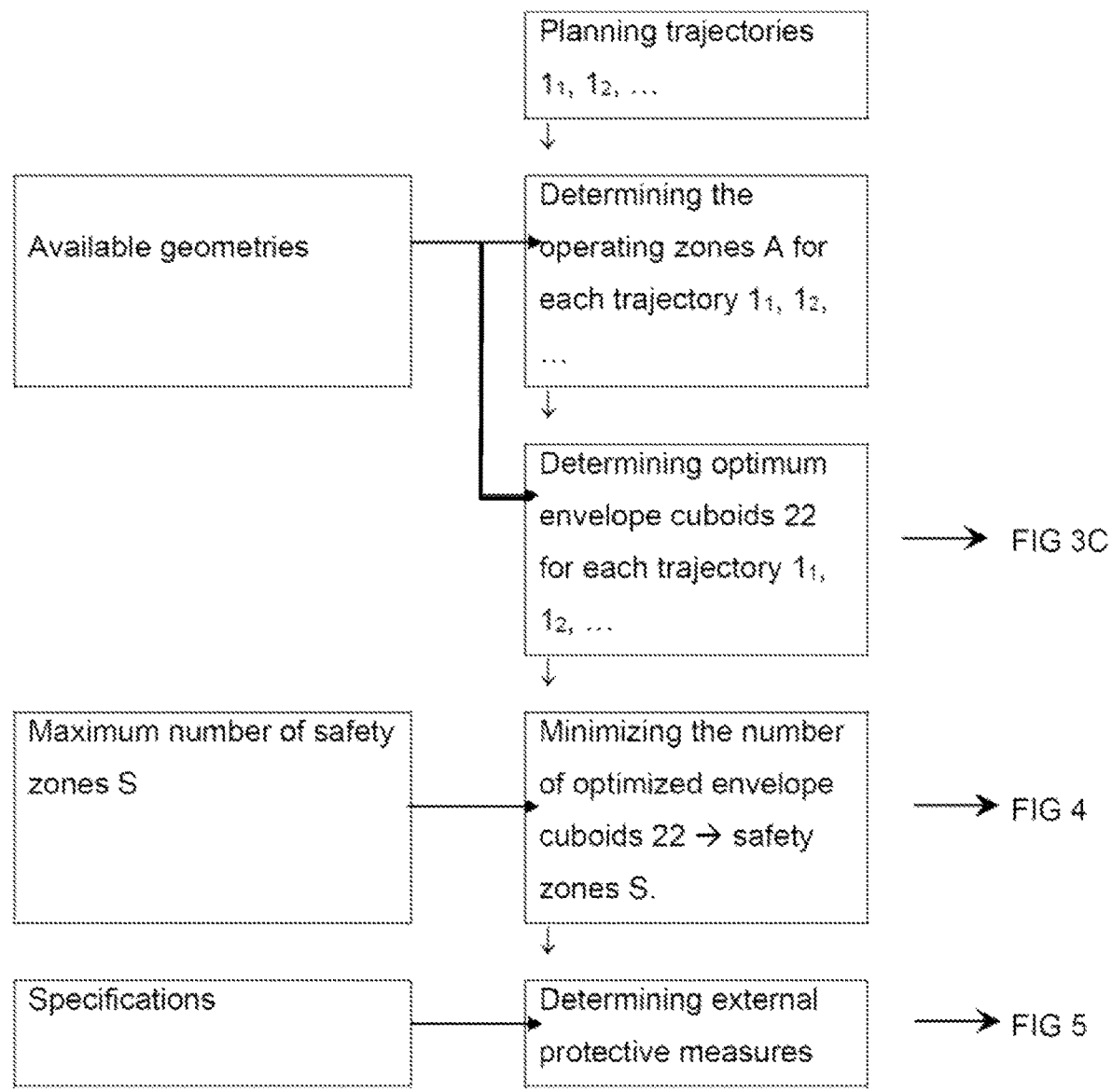
FIG. 9 is a block diagram including Table 1, which shows a sequence for determining safety zones for a plurality of trajectories to be travelled through by a robot, in accordance with one particular embodiment of the invention.

As a robot 5 has to travel through not only one, but a plurality of trajectories $1_1, 1_2, \ldots$ in order to fulfil its mission in its robot cell 15, the method explained above is accordingly to be applied in multiple stages and takes into consideration all these trajectories $1_1, 1_2, \ldots$, as is shown in Table 1 in FIG. 9. The result of this method to be applied in multiple stages is shown in FIG. 4 with the trajectories $1_1, 1_2, \ldots$ to be travelled by the robot 5 and, here, two optimized envelope cuboids $22_1, 22_2$. Table 1 shows the sequence for determining the safety zones $S_1, S_2, \ldots$ for a plurality of trajectories $1_1, 1_2, \ldots$ to be travelled through by a robot 5.

After determining the optimized envelope cuboids 22, 22', . . . for each individual trajectory $1_1, 1_2, \ldots$, the optimized envelope cuboids 22 (not indicated here) are overlaid and the total number thereof is minimized by combining and changing the size of individual envelope cuboids. The determination of external protective measures may contain: Light grids or laser scanners are positioned at the outer edges of the safety zones S defined by the optimized envelope cuboids 22 and the range of the fields (laser scanners) are calculated. Safety light grids act in an area by way of opposing transmitters and receivers for light beams. If the light beams are interrupted, e.g. when the light beam is penetrated by an object, then a corresponding safety function is triggered, e.g. stopping a robot movement.

Laser scanners are able to determine the distance to an object, i.e. a distance-dependent response can take place here on intrusion, e.g. decelerating a robot in the case of a greater distance and stopping in the case of a shorter distance.

Furthermore, a safety switch is also to be considered as a protective measure, for example, which is actuated by the opening of a door and by means of the fail-safe controller triggers a stop which does not cause a hazardous situation. In general: the safety zone S may be distinguished by mechanical limitations, wherein a door is merely one example of such a limitation. Furthermore, the geometric data of the envelope cuboids 22 is stored in a form which can be read by the fail-safe controller 31, meaning that this can be transferred from the simulation/calculation into the fail-safe controller 31 without manual steps which are prone to errors as a result.

Figure 10:
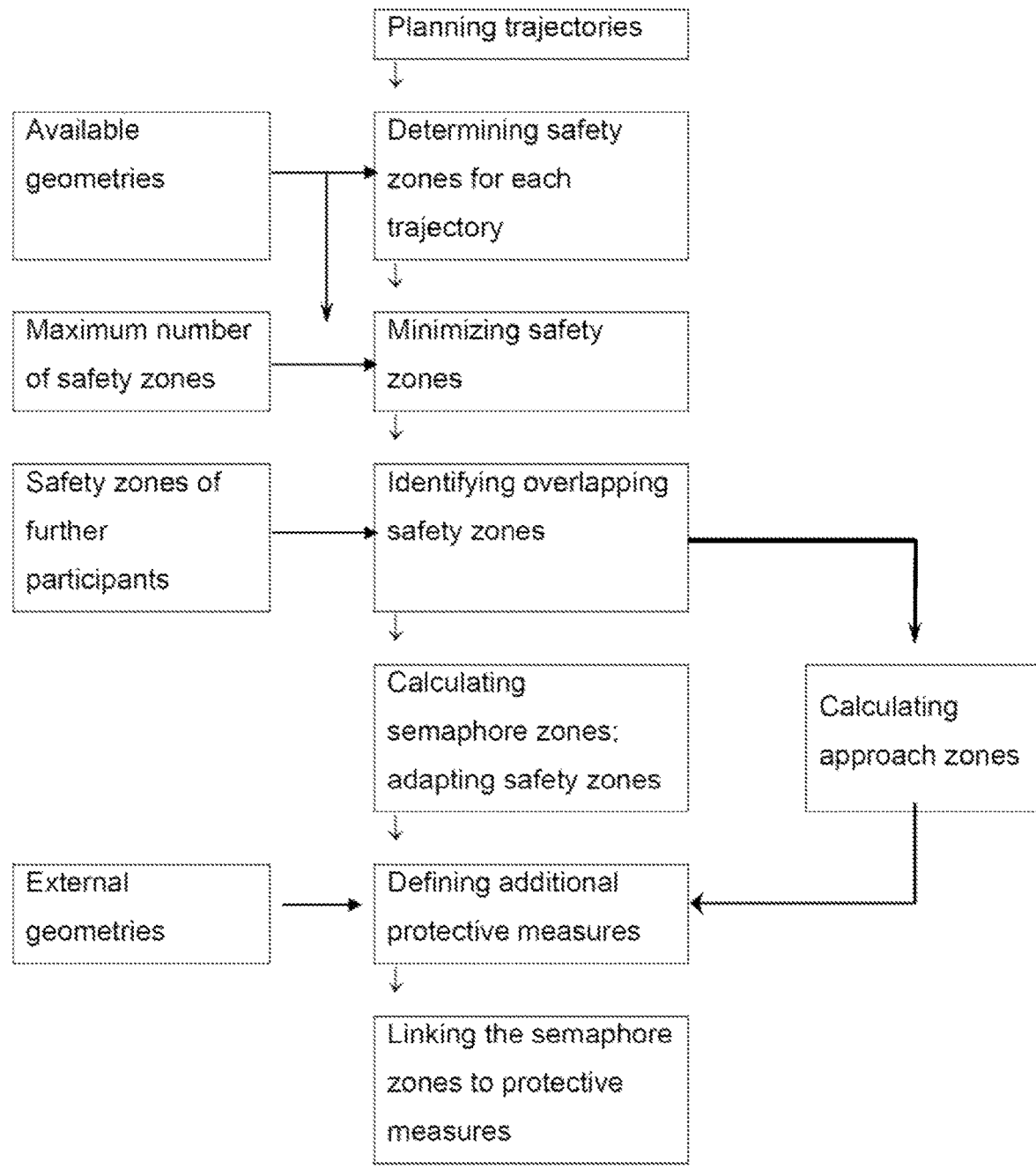
FIG. 10 is a block diagram including Table 2, which shows a block diagram that is an expansion of Table 1 of FIG. 9, which is expanded by the consideration of the individually determined safety zones of a plurality of robots, in accordance with one particular embodiment of the invention.

In a manufacturing cell 15, at least a plurality of robots 5, 5', . . . are present, meaning that the method explained above has to be expanded by a further method step. As the operating spaces A, A', . . . of the robots 5, 5', . . . overlap or have to overlap, it also has to be ensured that the robots 5, 5', . . . do not collide with one another during operation. The method according to Table 1 of FIG. 9 is thus expanded by the consideration of the individually determined safety zones S, S', . . . of the robots 5, 5', . . . , as shown in Table 2 of FIG. 10. To this end, between the optimization of the individual envelope cuboids 22 and the automatic derivation of the safety zones S, S', . . . and safety measures, the trajectories 1, 1', . . . of the robots 5, 5', . . . in question are superimposed.

Figure 6A:
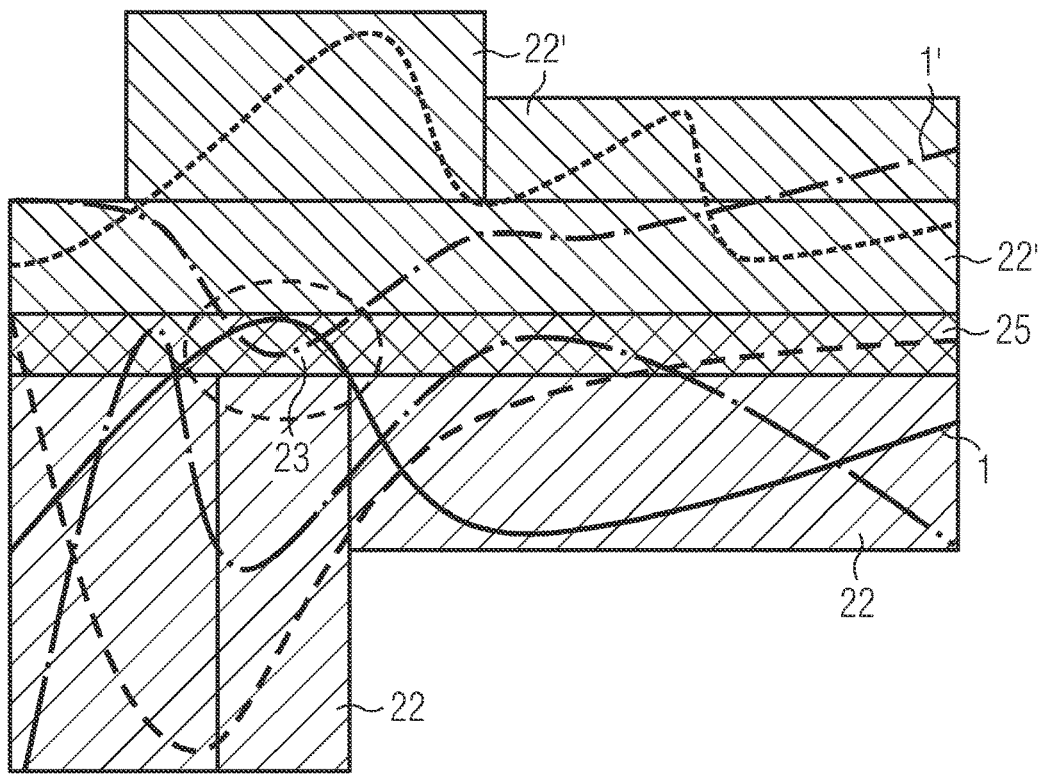
FIG. 6A is an illustration showing an overlaying of the safety zones of the trajectories of two robots with a collision zone/semaphore zone.
Figure 6B:
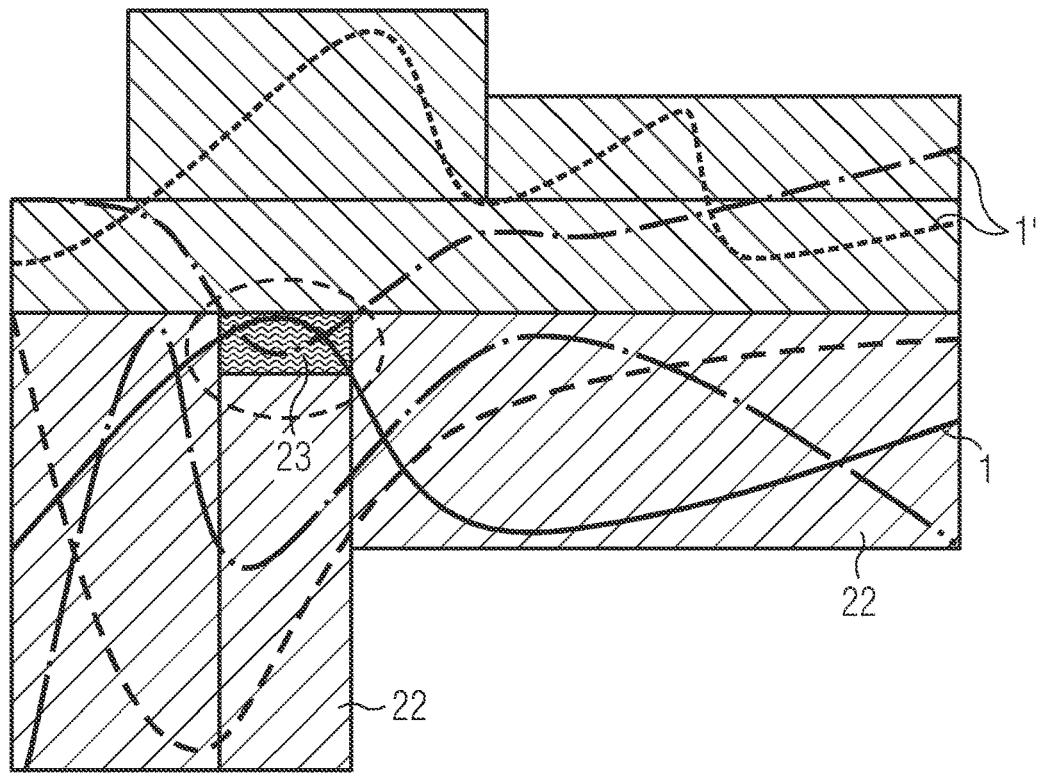
FIG. 6B is an illustration showing a recalculation of the safety zones of the trajectories of two robots with collision zone in a separate safety zone.

The situation for a first robot 5 with a trajectory 1 and the trajectory 1' of a further participant 5' or a further robot 5' is shown in FIG. 6A. The safety zone S of the robot 5 is defined by the amalgamation of the optimized envelope cuboids $22_i$, wherein the following formula is not indicated: $S=\cup 22_i$. Purely overlapping/superimposing the defined safety zones S, S' with the optimized envelope cuboids 22, 22' is not sufficient for this purpose; the overlapping zone is indicated as overlay zone 25 in FIG. 6A. A further review is absolutely necessary, as the two trajectories 1, 1' cross at least geometrically. In the range of this overlay zone 25, as shown in FIGS. 6A and 6B, the trajectories 1 of the one robot 5 are compared against the safety zones S or the optimized envelope cuboids 22' of the other robot 5'. In the example according to FIG. 6A, the trajectory 1 of the robot 5 runs through the safety zone S' or the optimized envelope cuboid 22' of the other robot 5': this is highlighted by the circle in FIG. 6A. For the sake of clarity, the envelope cuboids 22 and 22' are not shown with further indications in FIGS. 6A and 6B.

Subsequently, what is known as a semaphore zone 23 is defined first. This semaphore zone 23 is contained in the overlap zone 25, see FIG. 6B. The semaphore zone 23 likewise has the design of a cuboid. Following this, the previous optimized envelope cuboids 22 of both robots 5, 5' are adapted in their size or broken up into smaller cuboids or minimized, such that they no longer have any overlap with the semaphore zone 23, but the remaining trajectories 1, 1' fully enclose their own robots 5, 5'. The semaphore zone 23 is known from computer science according to the semaphore principle, which defines a "mutual exclusion". If one of the robots wishes to travel through a trajectory which traverses this semaphore zone 23, then this robot first has to request a permission to pass through ("take semaphore"). If the semaphore zone 23 is free, then the requesting robot receives the permission to pass through on the intended trajectory. If the semaphore zone 23 is currently occupied by another robot, however, then the requesting robot is either blocked until the semaphore zone 23 becomes free, or the robot receives a corresponding error message/notification message. The requesting robot is able to respond to such a message, for example by it first travelling through another trajectory, provided that this is permitted in operation.

After traversing the semaphore zone 23, this must be immediately released ("release semaphore"), in order for the other robot to be assigned to the semaphore zone 23 as quickly as possible.

The method is not limited to two robots, but rather is configured for N robots. In this context, the principle of minimizing the necessary zones, including the semaphore zones 23, also applies.

Likewise, the preceding method can also be used for other objects which may intrude into a collision zone with a robot, e.g. a manually steered forklift truck which delivers a pallet to the robot. The forklift truck or the driver thereof also has to request the semaphore zone and release it again after ending occupancy. This may also take place implicitly via a traffic light and a monitoring of the forklift truck zone (e.g. by means of laser scanners). This also makes it possible to collaborate between a person and a robot, as the movements thereof are also already taken into consideration in the simulation phase and are modelled as "N+1" robots. All further steps of this method subsequently proceed on an automated basis, as previously, and supply the appropriate safety zones on the basis of the optimized envelope cuboids, taking into consideration the necessary specifications (see Table 1 of FIG. 9 and Table 2 of FIG. 10).

As the blockage of a robot 5 due to a dynamically occupied semaphore zone 23 cannot be predicted, the robot 5 is stopped from carrying out its current task and is only able to continue once the previously occupied zone is released, as described above.

In order to also solve this problem, the trajectories 1, 1' of the robots 5, 5' . . . must also be planned on a dynamic basis. The concept of dynamic trajectory planning is known in robots, but is generally based on the robot also having a correspondingly sized operating space A available beyond the extent necessary for the specified trajectories. Traditionally, the robot stands in a robot cell closed off by lattices or similar guards.

On the basis of the concept for determining a safety zone S described earlier, which safety zone S is formed from a plurality of optimized envelope cuboids 22, the optimized envelope cuboids 22 defined in this way are used as a basis for a dynamic trajectory planning. For this reason, this calculation takes place in a fail-safe controller 31, so that the safety of the robot can also be guaranteed for a new trajectory, in a complete and certified manner at all times.

In order to ensure that a new trajectory is carried out correctly within the permitted zones, the robot controller must possess the feature of "Cartesian safety", so that the fail-safe controller 31 also knows where a robot 5' is actually situated. The "Cartesian safety" is only ensured with interaction between robots with fail-safe encoders (joint angle sensors) and fail-safe controller. The result of the trajectory planning is in turn first given in the higher-level calculation of the optimized envelope cuboids 22, so that a recalculation may take place on the basis of a new, additional trajectory.

Figure 7:
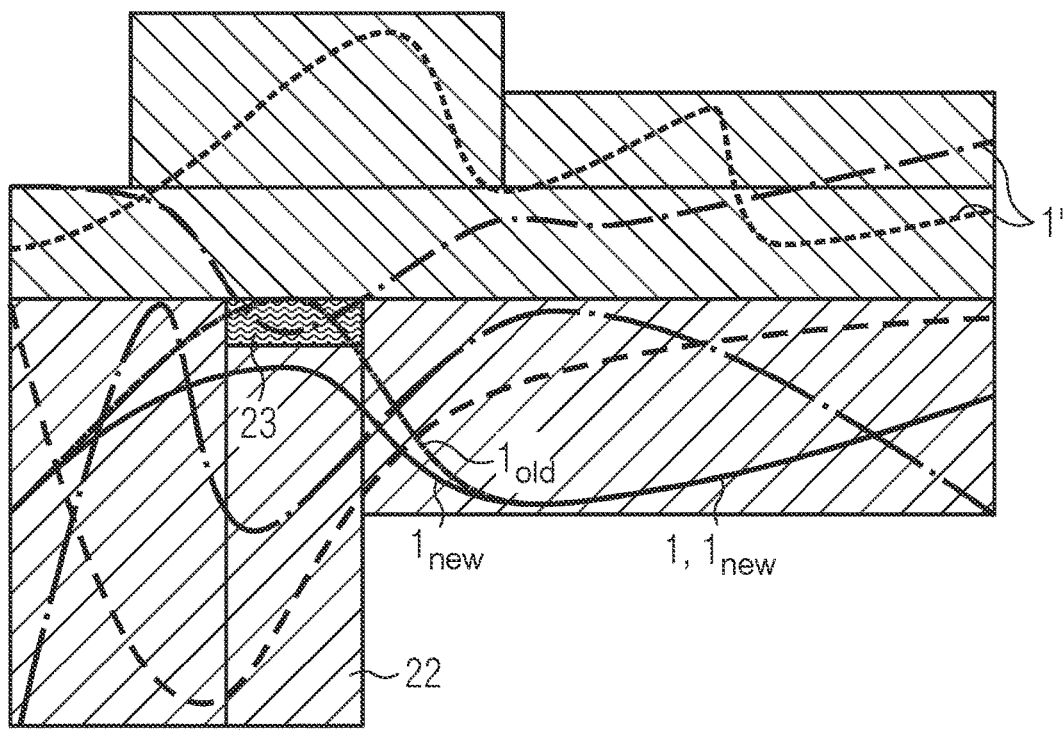
FIG. 7 is an illustration showing a representation of a recalculated trajectory on the basis of a specified semaphore zone.

FIG. 6B shows the known case of the trajectory 1 not being able to be carried out, because the semaphore zone 23 is occupied. For this reason, a recalculation/replanning is made on the basis of the defined optimized envelope cuboids 22 which run past the semaphore zone 23. For this trajectory $1_{new}$, it is first validated that it does not lead to a further semaphore zone 23'. The new trajectory $1_{new}$ differs from the old trajectory 1 only in subtrajectories. This new trajectory $1_{new}$ is recorded in the list of permitted trajectories, but is only used in the case of occupied semaphore zones 23, as it is expected to be less efficient compared to the original trajectory 1. Instead of list, the term trajectory library is also used. In a conflict situation, a trajectory taken from the trajectory library is more efficient, as the original trajectory is blocked and thus leads to delays. The result of the recalculation of a trajectory is shown in FIG. 7.

For the new trajectory $1_{new}$, it is also implicitly guaranteed that the robot 5 does not collide with a static obstacle in the manufacturing cell 15 on this new trajectory $1_{new}$, as the safety zones S, S' allowed on the basis of the optimized envelope cuboids 22 also map the geometry of a robot cell 15 with all its equipment. Of course, this property also applies for the determination of a safety zone S for a specified trajectory 1 of a robot 5 explained in the introduction.

Figure 8:
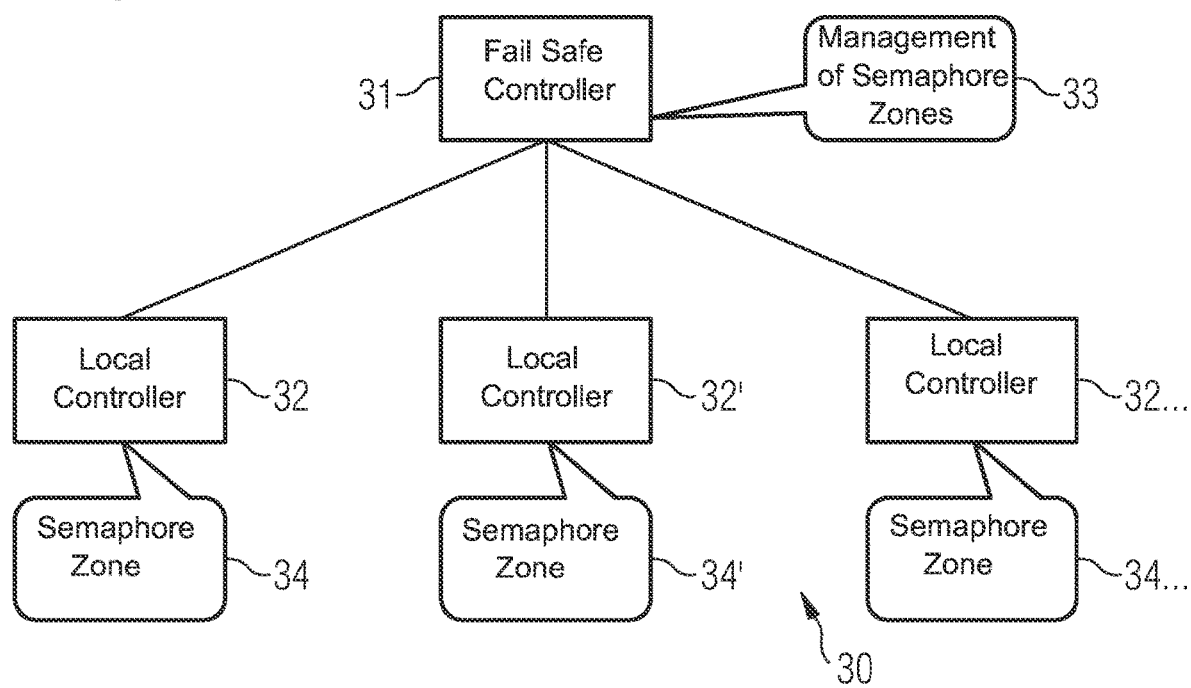
FIG. 8 is a block diagram of a robot system containing a plurality of robots and a fail-safe controller.

FIG. 8 shows the controller architecture, in which a higher-level fail-safe controller 31 manages the semaphore zones 23. The subordinate robot controllers of the individual robots 5', 5", . . . have to begin a query 34', 34", . . . in relation to this semaphore zone 23 during real-time operation, in order to be able to occupy the corresponding semaphore zone 23 following successful assignment—whether this is by travelling through it or due to an operation with an arm of the robot 5', 5", . . . in question. Following successful use, the robot 5', 5", . . . in question has to release the semaphore zone 23 again, which is no longer required and is no longer occupied. The advantage of this higher-level fail-safe controller 31 lies in being able to take into consideration further parameters when allocating the semaphore zones 23, e.g. the priority of the orders of the individual robots 5', 5", . . . .

The dynamic trajectory planning with a trajectory library for a further robot 5' is undertaken by the higher-level fail-safe controller 31. In this higher-level fail-safe controller 31, all data regarding all safety zones/optimized envelope cuboids 22 and regarding the semaphore zones 23 is available→management 33 of the semaphore zone. As a result, it is ensured that a new, dynamically generated trajectory does not lead to a semaphore zone. A new semaphore zone could lead to new blockages and severely increase the management effort in the higher-level fail-safe controller 31. Instead of the term "higher-level fail-safe controller", the term "central fail-safe controller" is also used.

LIST OF REFERENCE CHARACTERS, GLOSSARY

1 Trajectory of a (first) robot, robot path
$1_{1T}, 1_{2T}, \ldots$
   Subtrajectory of a (first) robot
$1_1, 1_2, \ldots$
   Trajectories of a (first) robot
1', 1" . . .
   Trajectory of further robots, trajectory of further participants
4; $4_1$; $4_2$; . . .
   Envelope cuboid, delimiting sphere, envelope ellipsoid
5 Robot, first robot
5', 5", . . .
   Further robots, further participants
6 (Attempted) intrusion into a safety zone
7 Extreme points of a trajectory
15 Robot cell; manufacturing cell
20 Envelope cuboid, global envelope cuboid of a (first) robot
20', 20"
   Envelope cuboid, global envelope cuboid of the further robots,
   Envelope cuboid, global envelope cuboid of the further participants
21 Fine-grained envelope cuboid of a (first) robot
21', 21"
   Fine-grained envelope cuboids of the further robots,
   Fine-grained envelope cuboids of the further participants
$21_{1T}, 21_{2T}, \ldots$
   Fine-grained envelope cuboid according to a subtrajectory $1_{1T}, 1_{2T}, \ldots$
22 Optimized envelope cuboids of a (first) robot
22', 22"
   Optimized envelope cuboids of the further robots
   Optimized envelope cuboids of the further participants
$22_1, 22_2, \ldots$
   Optimized envelope cuboid according to a plurality of fine-grained envelope cuboids $21_{1T}, 21_{2T}, \ldots$,
$24_{nO}$
   Example of an unoptimized envelope cuboid
23 Collision zone, semaphore zone
25 Overlaying/overlapping of two safety zones or two optimized envelope cuboids; overlay zone
30 Robot system, robot plant
31 Fail-safe controller 32 Local controller of first robots
32', 32", ...,
   Local controller of further robots
33 Management of semaphore zones
34', 34", ...,
   Querying/use/release of a semaphore zone by a robot 5', 5", ...
A, A', ...,
   Operating zone of a robot 5', 5", ...
S, S', ...,
   Safety zone of a robot 5', 5", ...
$S_1, S_2, ...$
   Safety zone for the trajectories $1_1, 1_2, ...$ of a robot 5
TCP Tool center point

LIST OF CITED DOCUMENTS

[1] WO 2018/051151 A1
A METHOD AND A SYSTEM FOR SIMULATING AND CERTIFYING SAFETY MANAGEMENT FOR AN AREA OF A PRODUCTION PLANT SIEMENS INDUSTRY SOFTWARE LTD.;
IL-7019900 Airport City
Publication date 22 Mar. 2018 (22.03.2018)
[2] WO 2015/176802 AI
METHOD FOR PREVENTING COLLISIONS OF A ROBOT IN A WORKSTATION
DAIMLER AG, DE-70327 Stuttgart
Publication date 26 Nov. 2015 (26.11.2015)

The invention claimed is:

1. A method for determining a safety zone for a first robot carrying out operations along a specified trajectory, the safety zone for a collision-free operation being determined by the following method steps of:
   a) dividing the specified trajectory into a plurality of subtrajectories;
   b) determining a plurality of envelope cuboids, referred to as fine-grained envelope cuboids in the following, around extreme points of each subtrajectory;
   c) determining a number of optimized envelope cuboids from an enlargement of individual ones of the fine-grained envelope cuboids based on a volume occupied by enlarged fine-grained envelope cuboids, wherein the optimized envelope cuboids determined in this way form the safety zone for the trajectory;
   d) determining a further safety zone for a further robot, for which a further trajectory is specified, wherein the further robot interacts with the first robot, by performing the further steps of:
      carrying out the method steps a) to c) for the further trajectory, and the safety zone and the further safety zone determined for said specified trajectory and the further trajectory are overlaid, which produces an overlap zone;
      defining a cuboid-shaped semaphore zone contained in the overlap zone, the cuboid-shaped semaphore zone contains a crossing of the further trajectory and the specified trajectory and is minimized compared to the optimized envelope cuboids of the further safety zone and the safety zone; and
   e) recalculating a new trajectory based on the optimized envelope cuboids determined in step c), the first robot carrying out operations along the new trajectory when a blockage occurs along the specified trajectory in real time.

2. The method according to claim 1, wherein in the method step b), movement spaces of the first robot corresponding to the operations to be carried out are defined by envelope spheres, wherein each envelope sphere represents a maximum claimed movement space per extreme point and the fine-grained envelope cuboids are determined such that they surround the envelope spheres.

3. The method according to claim 1, wherein in the method step b), movement spaces of the first robot corresponding to the operations to be carried out are defined by envelope ellipsoids, wherein each envelope ellipsoid represents a maximum claimed movement space per extreme point and the fine-grained envelope cuboids are determined such that they surround the envelope ellipsoids.

4. The method according to claim 1, wherein in the method step b), movement spaces of the first robot corresponding to the operations to be carried out are defined by fixed, specified envelope spheres and the fine-grained envelope cuboids are determined such that they surround the fixed, specified envelope spheres.

5. The method according to claim 1, which further comprises:
   f) defining protective measures.

6. The method according to claim 5, wherein in the method step f) alternatively or cumulatively, the protective measures are defined by:
   positioning at least one light grid containing a plurality of light beams at edges of the safety zone, wherein a safety function is triggered when a light beam is interrupted;
   positioning at least one laser scanner at the edges of the safety zone, wherein the laser scanner measures a distance to an intruding object, so that a distance-dependent safety function is triggered; and
   positioning a safety switch at the edges of the safety zone, wherein the safety switch triggers a safety function when a mechanical limitation of the safety zone is opened.

7. The method according to claim 1, wherein the optimized envelope cuboids on which a determination of the safety zone and the further safety zone is based are used as a basis for redetermining the specified trajectory of the first robot in such a way that a redetermined trajectory avoids the cuboid-shaped semaphore zone.

8. The method according to claim 7, wherein the specified trajectory and the further trajectory of the first robot and the further robot and the redetermined trajectory of the first robot are stored in a trajectory library of a central fail-safe controller.

9. The method according to claim 1, wherein in real-time operation, the first robot and the further robot start a query to a fail-safe controller, in order to obtain a permission to pass through a semaphore zone.

10. The method according to claim 1, which further comprises carrying out the method steps for a plurality of further robots.

11. The method according to claim 1, which further comprises carrying out the method steps for a plurality of trajectories of at least one robot.

12. A robot system, comprising:
   at least one robot carrying out operations along a specified trajectory;
   a local controller situated on said at least one robot; and
   a central fail-safe controller determining a safety zone for a collision-free operation of said at least one robot by:
      a) dividing the specified trajectory into a plurality of subtrajectories;

b) determining a plurality of envelope cuboids, referred to as fine-grained envelope cuboids in the following, around extreme points of each subtrajectory;

c) determining a number of optimized envelope cuboids from an enlargement of individual ones of the fine-grained envelope cuboids based on a volume occupied by enlarged fine-grained envelope cuboids, wherein the optimized envelope cuboids determined in this way form the safety zone for the trajectory;

d) determining a further safety zone for a further robot, for which a further trajectory is specified, wherein the further robot interacts with said at least one robot, by performing the further steps of:

carrying out the steps a) to c) for the further trajectory, and the safety zone and the further safety zone determined for said specified trajectory and the further trajectory are overlaid, which produces an overlap zone;

defining a cuboid-shaped semaphore zone contained in the overlap zone, the cuboid-shaped semaphore zone contains a crossing of the further trajectory and the specified trajectory and is minimized compared to the optimized envelope cuboids of the further safety zone and the safety zone; and e) recalculating a new trajectory based on the optimized envelope cuboids determined in step c), the first robot carrying out operations along the new trajectory when a blockage occurs along the specified trajectory in real time.

13. A non-transitory computer readable medium storing computer executable instructions to be executed on a computer system and/or on a central fail-safe controller of a robot system, the computer executable instructions carrying out a method for determining a safety zone for a first robot carrying out operations along a specified trajectory, the safety zone for a collision-free operation being determined by the following method steps of:

a) dividing the specified trajectory into a plurality of subtrajectories;

b) determining a plurality of envelope cuboids, referred to as fine-grained envelope cuboids in the following, around extreme points of each subtrajectory; and c) determining a number of optimized envelope cuboids from an enlargement of individual ones of the fine-grained envelope cuboids based on a volume occupied by enlarged fine-grained envelope cuboids, wherein the optimized envelope cuboids determined in this way form the safety zone for the trajectory;

d) determining a further safety zone for a further robot, for which a further trajectory is specified, wherein the further robot interacts with the first robot, by performing the further steps of:

carrying out the method steps a) to c) for the further trajectory, and the safety zone and the further safety zone determined for said specified trajectory and the further trajectory are overlaid, which produces an overlap zone;

defining a cuboid-shaped semaphore zone contained in the overlap zone, the cuboid-shaped semaphore zone contains a crossing of the further trajectory and the specified trajectory and is minimized compared to the optimized envelope cuboids of the further safety zone and the safety zone; and e) recalculating a new trajectory based on the optimized envelope cuboids determined in step c), the first robot carrying out operations along the new trajectory when a blockage occurs along the specified trajectory in real time.

* * * * *